United States Patent Office 3,647,832
Patented Mar. 7, 1972

3,647,832
RUTHENIUM COMPLEXES AND PROCESSES
FOR THEIR PREPARATION
Pierre Chabardes and Louis Colevray, Lyon, France, assignors to Rhone-Poulenc S.A., Paris, France
No Drawing. Filed Mar. 18, 1968, Ser. No. 714,010
Claims priority, application France, Mar. 23, 1967,
100,058; Apr. 11, 1967, 102,292; June 29, 1967,
112,456; Dec. 11, 1967, 131,753
Int. Cl. C07f 15/00
U.S. Cl. 260—429 J   14 Claims

ABSTRACT OF THE DISCLOSURE

The invention provides new ruthenium complexes of the formula:

$$[Ru(Diket)_2(CO)_xL_y]_z$$

in which Diket is a β-diketone residue, L is a mono- or poly-dentate ligand residue other than a β-diketone, $x$ and $z$ are positive integers, $y$ is zero or a positive integer and $x+y+z=3$, which are useful as ruthenium catalysts, e.g. in the dimerization or hydrodimerization of acrylonitrile.

---

The present invention relates to ruthenium complexes and their preparation.

Various carbonyl complexes of Group VIII metals with ligands such as phosphines, arsines, dipyridyl, pyridine, phenanthroline, and monoolefines and diolefines, have been prepared. Examples of such complexes include o-phenanthroline - pentacarbonyl - iron, tricarbonyl-bis-(triphenylphosphine) - iron, bis(pyridine)diiodo - dicarbonyl-iron, bis(dipyridyl) - diiodo-dicarbonyl-ruthenium, bis(pyridine) - diiodo-dicarbonyl-ruthenium, tris(phenyldiethyl-phosphine)-dichloro-carbonyl-ruthenium, and bis pyridine) - chloro-dicarbonyl-rhodium. Generally, these complexes may be prepared by bringing the ligand together with a metal carbonyl or a halogenated derivative of a metal carbonyl, or by reacting carbon monoxide with a halogenated complex of the chosen ligand [Cf. Advances in Organometallic Chemistry 3 pages 224 to 261 (1965)].

Furthermore, various chelates of ruthenium are known which contain both a β-diketone residue and a monodentate or polydentate ligand. Thus British patent specification No. 956,242 describes complexes such as acetylacetonato-bis(5,6 - dimethyl - 1,10 - phenanthrolino) ruthenium chloride, acetylacetonato - bis(4,4' - diethyl-2,2' - bipyridino)ruthenium chloride, and 4,4'-diethyl-2,2' - bipyridino - bis(acetylacetonato)ruthenium chlorde. These complexes are prepared by reacting acetylacetone with the corresponding halogenated complexes (for example dichloro-bis(4,4' - diethyl-2,2'-bipyridino)ruthenium) in an alcohol in the presence of calcium carbonate.

Complexes of transition metals, and in particular of ruthenium, have also been prepared, which simultaneously contain ligands of the type of ammonia, aniline, acetonitrile, pyridine, dipyridyl, triphenylphosphine and carbon monoxide, by reacting halogenated complexes of ruthenium with alcohols, optionally in the presence of an alkaline base, or by reacting a ruthenium halide with a Lewis base in an alcohol [Chatt et al., Chem. and Ind. 1960, 931 and 1961, 290; and Vaska, ibid. 1961, 1402, J. Amer. Chem. Soc. 83 1262 (1961) and 86 1943 (1964)].

It has also been proposed [Bonati et al. J. Chem. Soc. (1964) 3156 to 3160] to prepare carbonyl complexes of rhodium, derived from β-diketones of general formula:

(β-diketone)Rh(CO)$_2$ by reacting β-diketones such as acetylacetone with tetracarbonyldichloro-μ-dirhodium in the presence of a base such as barium carbonate.

It is also known (French patent specification No. 1,381,091) that on reacting carbon monoxide with a tris(β-dionato)ruthenium in the presence of hydrogen at temperatures ranging from 100 to 250° C. and at pressures of 50 to 350 atmospheres, in a solvent for the reagents employed, dodecacarbonyl - triruthenium is formed.

Finally it is known (Certificate of Addition No. 88,673 to French patent specification No. 1,381,091) that in the presence of compounds which are hydrogen donors, such as alcohols and methylketones, dodecacarbonyl-triruthenium can be prepared without working in a hydrogen atmosphere.

However, up to now ruthenium complexes containing a β-diketone residue and a ligand of the carbon monoxide type have not been described, neither have complexes of ruthenium containing a β-diketone residue, a ligand of the carbon monoxide type and a monodentate or polydentate ligand other than the β-diketone ligand.

The present invention provides the new complexes of ruthenium of the general formula:

$$[Ru(Diket)_2(CO)_xL_y]_z \quad (I)$$

in which Diket represents a β-diketone residue, L represents a monodentate or polydentate ligand other than β-diketone, $x$ and $z$ are positive integers, $y$ is zero or a positive integer, and $x+y+z=3$.

If the β-diketone is represented by $$R_1\text{—CO—CHR}_2\text{—CO—}R_3$$

the residue (Diket) is the residue of formula:

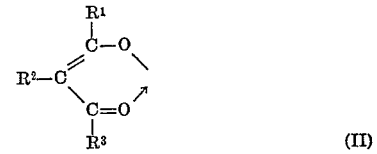

(II)

wherein R[1] and R[3] are organic radicals, especially lower alkyl, lower perfluoroalkyl, phenyl, or naphthyl, and R[2] is hydrogen or an organic radical, especially lower alkyl, and R[1] and R[3], or R[1] and R[2] (or R[2] and R[3]) or both R[1] and R[2] and R[2] and R[3] may be joined, e.g. to form a saturated cycloaliphatic 5- or 6-membered ring. Examples of such β-diketones include acetylacetone, 2,4 - hexanedione 2,4 - heptanedione, 5 - methyl - 2,4 - hexanedione; 3,5 - heptanedione; 1,1,1 - trifluoro - 2,4 - pentanedione, benzoylacetone; dibenzylmethane; 1,1,1 - trifluoro - 2-2' - benzoylacetone; β - isonaphthoyl - trifluoroacetone; 3-methyl - 2,4 - pentanedione; 1,3 - cyclopentanedione; 1,3-cyclohexanedione; 5,5 - dimethyl - 1,3 - cyclohexanedione; 2 - acetyl - cyclohexanone; and 1,8 - hexahydronaphthalenedione.

The ligand L may be taken from amongst organic compounds which carry one or more electron doublet donor groups, also called Lewis bases. Amongst these ligands there may especially be quoted monoamines or polyamines such as methylamine, ethylamine, cyclohexylamine and ethylenediamine; aldehydes such as formaldehyde, acetaldehyde and benzaldehyde; imines such as acetaldimine; amides such as dimethylformamide and propionamide; nitriles, especially saturated or ethylenically unsaturated aliphatic nitriles of 1 to 5 carbon atoms, such as propionitrile, acetonitrile and acrylonitrile; tertiary phosphines such as triphenylphosphine; tertiary arsines and stibines; monoolefinic or polyolefinic compounds such as for example the cyclooctadienes; and heterocyclic bases, especially aromatic nitrogen containing bases, such as pyridine, 2,2'-bipyridyl and 1,10-phenanthroline.

The ruthenium complexes of Formula I may be obtained by the various processes defined below:

(1) The compounds in which $x=1$, $y=0$ and $z=2$, which correspond to the formula:

$$[Ru(Diket)_2(CO)]_2 \qquad (III)$$

may be obtained by reacting a tris($\beta$-dionato)ruthenium of formula $Ru(Diket)_3$ with a compound capable of furnishing a carbonyl group. Suitable compounds which are carbonyl group donors include alcohols such as methanol, ethanol, methoxyethanol, ethylene glycol, diethylene glycol, triethylene glycol, allyl alcohol and benzyl alcohol; amides such as dimethyformamide or dimethylacetamide; aldehydes such as methanol, ethanol or propanal; and acid chlorides such as acetyl chloride.

The reaction may be carried out either in an inert in-hydrocarbon solvent such as pentane, hexane, cyclohexane or benzene, or preferably in an excess of the carbonyl group donor, as a reactive solvent.

The reaction conditions vary according to the reagents employed. In general the reaction temperature may be between 20 and 200° C. The reaction may be carried out under the autogenous pressure of the reagents if the reaction requires a temperature above the boiling point of the solvent.

(2) The compounds of Formula I in which $x=y=z=1$, which correspond to the formula $$Ru(Diket)_2(CO)L \qquad (IV)$$

may be prepared either by reacting a ligand L with a carbonyl complex of $\beta$-dionato-ruthenium of Formula III [whose preparation has been described under (1)] or by replacing a ligand L' by another ligand L, ligand L' being a weaker electron donor than L.

The compounds of Formula III may be reacted with a ligand L either in an inert diluent or solvent such as an aliphatic, cycloaliphatic or aromatic hydrocarbon, amongst which may be quoted pentane, cyclohexane and benzene, or, in the case where the ligand L is a compound which is liquid under the reaction conditions, in an excess of this ligand, which plays the role of a diluent or solvent. The reaction temperature may vary within wide limits depending on the reagents used.

If the compounds of Formula IV are prepared by substituting one ligand L for another ligand L', the substitution reaction may take place in an inert solvent such as those defined above or in an excess of the ligand L being introduced if the latter is liquid under the reaction conditions. When working in an inert solvent, it is possible to employ molar quantities of the complexes of Formula IV and of the ligand L being introduced which are close to the stoichiometric quantities, or to employ a slight excess of the ligand L. The general reaction conditions vary from case to case but can easily be found by routine experiment.

(3) The compounds of Formula I in which $x=2$, $y=0$ and $z=1$, which correspond to the formula:

$$Ru(Diket)_2(CO)_2 \qquad (V)$$

may be obtained by one of the processes defined below:

(a) From a tris($\beta$-dionato)ruthenium.

This process consists in reacting carbon monoxide with a tris($\beta$-dionato)ruthenium in a solvent such as an aliphatic hydrocarbon (pentane) or hexane), a cycloaliphatic hydrocarbon (cyclohexane) or an aromatic hydrocarbon (benzene) or an ether oxide (2-methoxy-ethane or dioxane). The carbon monoxide pressure employed may vary from 5 to 100 bars. The reaction temperature is not critical and depends on the tris($\beta$-dionato)ruthenium employed.

It is particularly advantageous to work in the presence of a ruthenium derivative, such as hydrated ruthenium oxide $RuO(OH)_2$, or a carbonyl derivative of ruthenium, $Ru(CO)_5$, $Ru_2(CO)_9$ or $Ru_3(CO)_{12}$, or in the presence of metallic ruthenium which may or may not be deposited on a carrier such as barium or calcium carbonate, alumina or silica. This results in an activation of the reaction.

The amount of activator employed may vary within wide limits. Thus it is possible to work in the presence of a quantity of activator which introduces a quantity of ruthenium metal equal to 0.001–10% of the weight of the metallic ruthenium introduced by the tris($\beta$-dionato) ruthenium. It is possible to exceed a quantity of ruthenium above 10% by weight without going outside the scope of the present invention but this does not produce any additional advantage.

(b) From complexes of Formula III whose preparation has been described under (1).

The process consists of reacting carbon monoxide with the compounds of Formula III at at least atmospheric pressure, preferably under a pressure of 5 to 100 bars, in a solvent such as those quoted under (a). The temperature depends on the reagents employed.

(c) From complexes of Formula IV whose preparation has been described under (2).

The process is generally carried out in an inert solvent such as those quoted under (a), at at least atmospheric pressure, preferably under 5 to 100 bars, with the temperature depending, as in the case of the processes mentioned earlier, on the reagents employed.

(d) From complexes of formula:

$$Ru(Diket)_2L_2 \qquad (VI)$$

where Diket and L have the same significance as in Formula I.

The process consists of reacting carbon monoxide with a complex of Formula VI, generally in an inert solvent such as an aliphatic hydrocarbon (pentane or hexane), a cycloaliphatic hydrocarbon (cyclohexane) or an aromatic hydrocarbon (benzenes) or an ether (2-methoxy-ethane or dioxane). The carbon monoxide is preferably employed at a pressure of 5 to 100 bars. Lower pressures are not excluded but lead to low reaction speeds. Higher pressures may also be used. The reaction temperature is not critical and depends on the complex VI employed.

The complexes of Formula VI may be obtained by reacting a ligand L with a tris($\beta$-dionato)ruthenium under a hydrogen atmosphere and in the presence of a hydrogenation catalyst, particularly a catalyst based on ruthenium, optionally working in a solvent medium.

The complexes of Formula I may be employed as catalysts for various reactions of organic chemistry such as isomerisations, hydrogenations, carbonylations or dimerisation and in particular for the dimerisation and hydrodimerisation of acrylonitrile.

The following examples illustrate the invention.

EXAMPLE 1

10 g. of ruthenium acetylacetonate and 300 cm.³ of diethylene glycol are introduced into a 500 cc. flask equipped with a stirrer, a reflux condenser and a nitrogen inlet. On stirring, a red suspension is obtained which is heated to 145–150° C. under a nitrogen atmosphere. The solid product dissolves and the resulting solution, which is initially dark red, gradually changes to orange and then to greenish-yellow. After 2 hours heating the mixture is cooled, filtered and then concentrated by distillation under reduced pressure (0.1 mm. Hg). When the temperature in the flask reaches 120° C. the distillation is stopped. The resulting residue is then washed with 40 cc. of dichloroethane. 6.17 g. of a greenish-yellow product are thus obtained. The dichloroethane used for washing is distilled off in vacuo. 4.76 g. of a dry residue are recovered, which is added to the product obtained above. The whole is dissolved in chloroform (450 cc.) and the orange-yellow solution obtained is filtered through silica gel and the solvent then evaporated to give a dry product. 9.2 g. of a solid yellow product are obtained. After washing with 15 cc. of methanol and then with 10 cc. of pentane, 7 g. of a yellow product are obtained whose percentage analysis, infrared spectrum and mass spectrum correspond to the product of formula:

$$[Ru(C_5H_7O_2)_2(CO)]_2$$

wherein $C_5H_7O_2$ represents the β-diketone residue of formula:

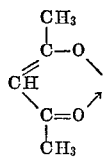

The ruthenium acetylacetonate used was obtained as follows. One part by weight of $RuCl_3$, 4 parts of distilled acetylacetone and 4 parts of water are introduced into a three-necked 250 cc. flask fitted with a stirrer, a condenser and a dropping funnel. Stirring is started and an aqueous sodium bicarbonate solution of strength 17% by weight is then gradually added until the pH of the reaction mixture is about 7. The mixture is kept under reflux for three hours. After standing for 16 hours the contents of the flask are cooled to 0° C. and filtered through a glass frit. The precipitate is washed three times with an amount of cold water corresponding to half its weight. The crude acetylacetonate thus obtained is dried to constant weight in vacuo in the presence of $P_2O_5$. The acetylacetonate thus obtained is purified by extraction with benzene in a Kumagawa extractor. The extract is evaporated to dryness. A product whose percentage analysis accords with theory is thus obtained.

EXAMPLE 2

3 g. of ruthenium acetylacetonate prepared as in Example 1 and 300 cc. of methoxy-ethanol are introduced into a 500 cc. stainless steel autoclave fitted with a stirrer. The mixture is then heated with constant stirring and under autogenous pressure to a temperature of 140° C. for 16 hours. The resulting solution is filtered, and the greenish filtrate is then evaporated to dryness under reduced pressure (20 mm. Hg), yielding 3.4 g. of a residue which is washed with 25 cc. of pentane. 1.8 g. of an insoluble product are thus obtained together with an orange-yellow filtrate from which 0.1 g. of a yellow product are isolated after concentration to 2 cc. The insoluble product is heated under reflux in 160 cc. of benzene; the resulting solution is filtered and concentrated to two-thirds. 0.8 g. of a yellow product are obtained. On adding 30 cc. of pentane to the mother solution, a further 0.3 g. of a yellow product are obtained; in total, 1.2 g. of a yellow product corresponding to the formula:

$$[Ru(C_5H_7O_2)_2(CO)]_2$$

are obtained.

EXAMPLE 3

1.2 g. of a complex of formula $[Ru(C_5H_7O_2)_2(CO)]_2$, prepared as in Example 1, and 90 cc. of acetonitrile are introduced into a 150 cc. flask fitted with a stirrer, a reflux condenser and a nitrogen inlet. A yellow suspension is obtained which is heated under reflux in an atmosphere of nitrogen, with stirring. After 1 hour 30 minutes' heating a homogeneous orange solution is obtained. Heating is continued for 1 hour 30 minutes and the resulting solution is then cooled to 20° C., filtered, and the filtrate concentrated under reduced pressure (20 mm. Hg). A yellow residue weighing 1.31 g. is obtained, whose percentage analysis, infra-red spectrum and mass spectrum agree with the formula:

$$Ru(C_5H_7O_2)_2(CO)(CH_3CN)$$

The yield relative to the complex introduced is 98%.

This complex is used in an acrylonitrile dimerisation reaction. 0.368 g. of $Ru(C_5H_7O_2)_2(CO)(CH_3CN)$, and 81 g. of acrylonitrile (stabilised with 0.05% of hydroquinone) are introduced into a 250 cc. stainless steel autoclave. The mixture is heated for 7 hours 30 minutes at 130° C., with stirring under a constant hydrogen pressure of 20 bars. On distillation of the product, 14.7 g. of a mixture of linear dimers (1,4-dicyano-butenes and adiponitrile) is collected, representing a yield of 52% relative to acrylonitrile converted (degree of conversion 35%).

EXAMPLE 4

100 mg. of a complex of formula $$Ru(C_5H_7O_2)_2(CO)(CH_3CN)$$

obtained as described in Example 3, and 20 cc. of propionitrile are introduced into a 50 cc. flask equipped as in Example 3. A lemon yellow solution is obtained, which is kept under reflux for 5 hours in an atmosphere of nitrogen. The solution is cooled to 20° C. and then concentrated under reduced pressure (25 mm. Hg). A pasty brownish-yellow residue is obtained, which is taken up in 5 cc. of pentane. A yellowish-beige insoluble material is isolated in this way and is filtered off, washed with 5 cc. of pentane, and dried. 91.8 mg. of a product are recovered whose infra-red spectrum and percentage analysis agree with the formula:

$$Ru(C_5H_7O_2)_2(CO)(CH_3—CH_2—CN)$$

The yield based on the bis(acetylacetonato)-carbonyl-acetonitrile-ruthenium introduced is 88%.

EXAMPLE 5

100 mg. of a complex of formula $$[Ru(C_5H_7O_2)_2(CO)]_2$$

and 20 cc. of propionitrile are introduced into the apparatus used in Example 4. The resulting suspension is heated under reflux for 5 hours and then cooled to 20° C., filtered, and the filtrate concentrated under reduced pressure (20 mm. Hg). A pasty brownish-yellow residue is obtained, which is washed with 10 cc. of pentane. A yellowish-beige precipitate is obtained which is filtered off and dried. In this way 105.7 mg. of a product identical to that of Example 4 are obtained. The yield, based on the complex introduced, is 90%.

EXAMPLE 6

100 mg. of bis(acetylacetonato)-carbonyl-acetonitrile-ruthenium, 6 cc. of acrylonitrile, and 6 cc. of benzene are introduced into the apparatus used in Example 4. The resulting solution is kept under reflux for 3 hours 30 minutes in an atmosphere of nitrogen, and then cooled to 20° C. and filtered. The filtrate is concentrated until a solid yellow residue is obtained, which is washed with pentane, filtered and dried. 73.3 mg. of a product are recovered whose percentage analysis and infra-red spectrum agree with the formula:

$$Ru(C_5H_7O_2)_2(CO)(CH_2=CH—CN)$$

EXAMPLE 7

100 mg. of bis(acetylacetonato)-carbonyl-acetonitrile-ruthenium, 71 mg. of triphenylphosphine, and 10 cc. of benzene are introduced into the apparatus used in Example 4. A light yellow solution is thus obtained which is kept under reflux for 3 hours, with stirring. The contents of the flask are cooled to 20° C. and then filtered. The filtrate is evaporated under reduced pressure (20 mm. Hg). A greenish-orange precipitate is obtained. A greenish-yellow precipitate is isolated by washing with pentane and dried. 94 mg. of a product are obtained whose percentage analysis and infra-red spectrum agree with the formula:

$$Ru(C_5H_7O_2)_2(CO)[(C_6H_5)_3P]$$

The yield is 59% based on the complex and the phosphine introduced.

EXAMPLE 8

100 mg. of bis(acetylacetonato)-carbonyl-acetonitrile-ruthenium, 83 mg. of triphenylarsine, and 10 cc. of anhydrous benzene are introduced into the apparatus used in Example 4. A greenish-yellow solution is obtained which is heated under reflux for 4 hours 50 minutes. A clear yellow solution is obtained. The benzene is removed by distillation under reduced pressure (20 mm. Hg). A slightly pasty yellow residue is isolated and on washing with 10 cc. of pentane yields 137.4 mg. of a lemon yellow product. On evaporating the pentane, a further 36.7 mg. of a product are obtained, making a total of 174.1 mg. of a product whose percentage analysis and infra-red spectrum agree with the formula:

$$Ru(C_5H_7O_2)_2(CO)[(C_6H_5)_3As]$$

The yield, based on the complex and the triphenylarsine, is quantitative.

EXAMPLE 9

10 mg. of bis(acetylacetonato)-carbonyl-acetonitrile-ruthenium, 97 mg. of triphenylstibine, and 10 cc. of anhydrous benzene are introduced into the apparatus used in Example 4. The resulting greenish-yellow solution is heated under reflux for 5 hours. A clear yellow solution is obtained which is cooled to 20° C. The benzene is removed by distillation under reduced pressure (20 mm. Hg). A golden-yellow residue is obtained which on washing with 10 cc. of pentane yields 103.9 mg. of a solid product. On evaporating the pentane, a second residue of 77.9 mg. is obtained. In total, 181.8 mg. of a product were isolated whose percentage analysis and infra-red spectrum agree with the formula:

$$Ru(C_5H_7O_2)_2(CO)[(C_6H_5)_3Sb]$$

The yield is 99%.

EXAMPLE 10

99.7 mg. of bis(acetylacetonato)-carbonyl-acetonitrile-ruthenium, and 20 cc. of pyridine are introduced into the apparatus used in Example 4. A yellow solution is obtained which is kept under reflux for 1 hour 15 minutes. The resulting golden-yellow solution is cooled and the pyridine is removed by concentration at 80° C. under reduced pressure (0.25 mm. Hg). The orange residue is taken up in 5 cc. of pentane. On filtration, an orange-yellow complex (96.6 mg.) is isolated whose micro-analysis and infra-red spectrum agree with the formula:

$$Ru(C_5H_7O_2)_2(CO)(C_5H_5N)$$

The yield is 88% based on the complex introduced.

EXAMPLE 11

7.25 g. of ruthenium acetylacetonate prepared as in Example 1, but without extraction with benzene, and 250 cc. of benzene are introduced into a 500 cc. autoclave equipped with a heating device and a stirrer. The autoclave is purged with a stream of carbon monoxide and closed, and carbon monoxide is then introduced up to a pressure of 50 bars. The contents of the autoclave are kept at 140° C. for 15 hours, the gas is released, the reaction mixture is filtered, and the solvent is evaporated. A red residue is isolated, which is extracted with 150 cc. of pentane. After evaporating the solution, 3.39 g. of a yellow product of melting point 124° C. are obtained, whose percentage analysis and infra-red spectrum correspond to the product of formula $Ru(C_5H_7O_2)_2(CO)_2$. The yield is 50% based on the ruthenium acetylacetonate introduced.

EXAMPLE 12

0.30 g. of ruthenium acetylacetonate, and 10 cc. of benzene are introduced in a 125 cc. stainless steel autoclave. The autoclave is purged with carbon monoxide, closed, and carbon monoxide is introduced to a pressure of 50 bars. The contents of the autoclave are kept at 140° C. for 16 hours. After the usual treatment, 0.027 g. of bis(acetylacetonato)dicarbonylruthenium are obtained, representing a yield of 10%.

The acetonate used as starting material was prepared as in Example 1.

EXAMPLE 13

0.50 g. of ruthenium acetylacetonate, as used in Example 1, 0.025 g. of $RuO(OH)_2$, and 12 cc. of anhydrous benzene are introduced into the apparatus described in Example 12. Following the procedure of Example 11, carbon monoxide is introduced to a pressure of 50 bars. The contents of the autoclave are heated to 140° C. for 16 hours, and then cooled to 20° C. The gas is released, the contents of the autoclave are filtered, and the filtrate is concentrated to dryness. A red solid residue is obtained which is extracted with 150 cc. of pentane. After concentrating the solution to dryness, 0.28 g. of bis(acetylacetonato)-dicarbonylruthenium are obtained. The yield is 64%.

EXAMPLE 14

The procedure of Example 13 is followed, replacing $RuO(OH)_2$ by 0.016 g. of powdered ruthenium obtained by reducing $RuO(OH)_2$. 0.1 g. of bis(acetylacetonato)-dicarbonyl-ruthenium are obtained, a yield of 24%.

EXAMPLE 15

The procedure of Example 13 is followed, replacing $RuO(OH)_2$ by 0.336 g. of ruthenium deposited on calcium carbonate (5% of metal). 0.32 g. of bis(acetylacetonato)dicarbonylruthenium are obtained, a yield of 72%.

EXAMPLE 16

The procedure of Example 13 is followed, replacing $RuO(OH)_2$ by 0.035 g. of $Ru_3(CO)_{12}$. After the usual treatments, 0.058 g. of bis(acetylacetonato)dicarbonyl-ruthenium are obtained, a yield of 13%.

EXAMPLE 17

100 mg. of bis(acetylacetonato)carbonyl-acetonitrile-ruthenium prepared according to Example 3, and 4 cc. of benzene are introduced into a 12.5 cc. autoclave equipped as in Example 11. Carbon monoxide is then introduced up to a pressure of 10 bars, following the previous procedure, and the contents of the autoclave are heated to 90° C. for 15 hours. A liquid solution is thus obtained which is evaporated under reduced pressure (20 mm. Hg). 95.3 mg. of bis(acetylacetonatodicarbonylruthenium (M.P. 124° C.) are obtained. The yield is 99%.

EXAMPLE 18

100 mg. of the compound of formula $$[Ru(C_5H_7O_2)_2(CO)]_2$$

and 4 cc. of anhydrous benzene are introduced into the autoclave used in Example 17. The contents of the autoclave are heated to 90° C. for 15 hours 30 minutes under a carbon monoxide pressure of 10 bars. A yellow solution is obtained which is evaporated under nitrogen. A viscous yellow residue is obtained. This is taken up in 20 cc. of pentane and the resulting solution is filtered through alumina. After evaporating the filtrate, 88.6 mg. of bis-(acetylacetonato)dicarbonylruthenium are isolated. The yield is 82%.

EXAMPLE 19

0.2 g. of $Ru(C_5H_7O_2)_2(CH_3-CN)_2$, and 15 cc. of toluene are introduced into a 125 cc. autoclave. Carbon monoxide is introduced to a pressure of 20 bars. The autoclave is heated to 110° C. for 15 hours, and then cooled. The gas is released, and the reaction medium concentrated. An orange-coloured solid residue is obtained which is mixed with 30 cc. of pentane, stirred vigorously, filtered through a filter, and the pentane is then evaporated from the filtrate. A yellow crystalline complex of formula:

$$Ru(C_5H_7O_2)_2(CO)_2$$

is thus obtained in a yield of 76%.

We claim:
1. A ruthenium complex of the formula

$$[Ru(Diket)_2(CO)_xL_y]_z$$

in which Diket represents a β-diketone residue of the formula:

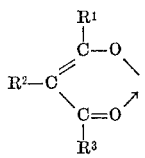

in which $R^1$ and $R^3$ are each lower alkyl, lower perfluoroalkyl, phenyl, or naphthyl, $R^2$ is hydrogen or lower alkyl, and $R^1$ and $R^3$, or $R^1$ and $R^2$, or both $R^1$ and $R^2$ and $R^2$ and $R^3$ may be joined together to form a saturated cycloaliphatic 5- or 6-membered ring, L represents a ligand selected from a nitrile, phosphine, arsine, stibine, or heterocyclic base, $x$ and $z$ are positive integers, $y$ is zero or a positive integer, and $x+y+z=3$.

2. A complex according to claim 1 in which the residue Diket is of the formula:

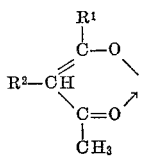

3. A ruthenium complex according to claim 1 in which $x=1, y=0,$ and $z=2$.

4. A ruthenium complex according to claim 1 in which $x=2, y=0,$ and $z=1$.

5. A ruthenium complex according to claim 1 in which $x=y=z=1$.

6. A ruthenium complex according to claim 1 in which the ligand L is acetonitrile, propionitrile, acrylonitrile, triphenylphosphine, triphenylarsine, triphenylstibine, or pyridine.

7. Process for the production of a ruthenium complex of the formula:

[Ru(Diket)$_2$(CO)]$_2$ wherein Diket represents a β-diketone residue of the formula:

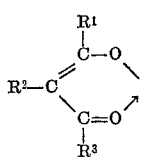

in which $R^1$ and $R^3$ are each lower alkyl, lower perfluoroalkyl, phenyl, or naphthyl, $R^2$ is hydrogen or lower alkyl, and $R^1$ and $R^3$, or $R^1$ and $R^2$, or both $R^1$ and $R^2$ and $R^2$ and $R^3$ may be joined together to form a saturated cycloaliphatic 5- or 6-membered ring, which comprises reacting a compound of the formula:

Ru(Diket)$_3$ with a compound capable of furnishing a carbonyl group selected from the group consisting of an alcohol, amide, aldehyde, and acid chloride.

8. Process according to claim 7 in which the compound capable of furnishing a carbonyl group is an alcohol.

9. Process according to claim 7 in which the reaction is carried out at 20 to 200° C.

10. Process for the production of a ruthenium complex of the formula:

Ru(Diket)$_2$(CO)$_2$ wherein Diket represents a β-diketone residue of the formula:

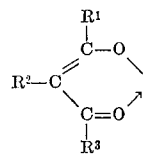

in which $R^1$ and $R^3$ are each lower alkyl, lower perfluoroalkyl, phenyl, or naphthyl, $R^2$ is hydrogen or lower alkyl, and $R^1$ and $R^3$, or $R^1$ and $R^2$, or both $R^1$ and $R^2$ and $R^2$ and $R^3$ may be joined together to form a saturated cycloaliphatic 5- or 6-membered ring, which comprises reacting a complex of the formula:

Ru(Diket)$_3$ with carbon monoxide under pressure in an inert organic solvent.

11. Process according to claim 10 in which the reaction is carried out in the presence of, as activator, finely divided metallic ruthenium, hydrated ruthenium oxide, or a ruthenium carbonyl.

12. Process according to claim 11 in which the amount of the said activator, expressed as ruthenium, is 0.001 to 10% of the weight of the ruthenium in the complex of formula:

Ru(Diket)$_3$

13. Process for the production of a ruthenium complex of the formula:

Ru(Diket)$_2$(CO)$_2$ wherein Diket represents a β-diketone residue of the formula:

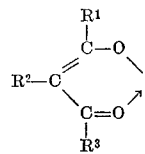

in which $R^1$ and $R^3$ are each lower alkyl, lower perfluoroalkyl, phenyl, or naphthyl, $R^2$ is hydrogen or lower alkyl, and $R^1$ and $R^3$, or $R^1$ and $R^2$, or both $R^1$ and $R^2$ and $R^2$ and $R^3$ may be joined together to form a saturated cycloaliphatic 5- or 6-membered ring, which comprises reacting a complex of the formula:

[Ru(Diket)$_2$(CO)]$_2$

Ru(Diket)$_2$(CO)L or

Ru(Diket)$_2$L$_2$ in which L is a ligand selected from a nitrile, phosphine, arsine, stibine, or heterocyclic base, with carbon monoxide at least atmospheric pressure in an organic solvent.

14. Process according to claim 13 in which the ligand L is acetonitrile.

References Cited

FOREIGN PATENTS 1,060,938   3/1967   Great Britain.

OTHER REFERENCES

Graddon et al., J. Inorg. Nucl. Chem. 21 (1961) pp. 49–52.

Fackler, Progress in Inorganic Chemistry, vol. 7 (1966), Interscience Publishers, New York, N.Y., p. 404.

TOBIAS E. LEVOW, Primary Examiner

A. P. DEMERS, Assistant Examiner

U.S. Cl. X.R.

252—431 R, 431 N, 431 P; 260—270 R, 429 R